United States Patent

Kurachi et al.

[11] Patent Number: 5,808,822
[45] Date of Patent: Sep. 15, 1998

[54] APPARATUS AND METHOD FOR CORRECTING A READ SIGNAL IN A DISK DRIVE SYSTEM BASED UPON A FRONT PEAK, A BACK PEAK AND A PEAK OF INTEREST

[75] Inventors: Koji Kurachi, Yokohama; Satoshi Hashimoto, Yamato; Hiroshi Yanagisawa, Kamakura, all of Japan

[73] Assignee: International Business Machines Corporation, Armonk, N.Y.

[21] Appl. No.: 549,378

[22] Filed: Oct. 27, 1995

[30] Foreign Application Priority Data

Oct. 31, 1994 [JP] Japan .................................. 6-267453

[51] Int. Cl.$^6$ .................................................. G11B 5/035
[52] U.S. Cl. ............................................. 360/65; 360/51
[58] Field of Search ................................. 360/65, 40, 46, 360/51, 67; 327/58, 59, 60, 61, 62, 74, 75; 364/481; 375/342; 369/124; 371/6

[56] References Cited

U.S. PATENT DOCUMENTS

| | | | |
|---|---|---|---|
| 4,306,194 | 12/1981 | Chapman | 327/62 |
| 4,306,257 | 12/1981 | Harman | 360/67 |
| 4,979,189 | 12/1990 | Wile | 375/342 |
| 5,105,316 | 4/1992 | Cronch et al. | 360/46 |
| 5,170,359 | 12/1992 | Sax et al. | 364/481 |
| 5,276,666 | 1/1994 | Gunther et al. | 360/45 X |
| 5,335,118 | 8/1994 | Meyer | 360/51 |
| 5,414,722 | 5/1995 | Tollum | 360/45 X |

FOREIGN PATENT DOCUMENTS 62-229503 3/1986 Japan .

*Primary Examiner*—W. R. Young
*Assistant Examiner*—Patrick Wamsley
*Attorney, Agent, or Firm*—Merchant, Gould, Smith, Edell, Welter & Schmidt, P.A.

[57] ABSTRACT

In a disk drive system, a circuit reduces the deterioration of the S/N ratio and corrects the position of a peak in a read signal to an accurate position. In one embodiment, a circuit senses the threshold levels corresponding to the magnitudes of three consecutive peaks of a read signal. A comparator obtains the direction of shift of the centrally positioned peak with respect to a reference position from the relationship of the magnitudes of the three consecutive peaks. The comparator outputs a pulse representing the direction of shift to a FIFO buffer. A delay circuit outputs a plurality of pulses. The pulses are shifted by an amount corresponding to a threshold level. A multiplexer selects a pulse to output from the delay circuit based on the direction of shift that was output from the FIFO buffer and based on the difference detected by an amplitude detection circuit. In an alternative embodiment, the correction circuit is implemented using a microprocessor.

12 Claims, 10 Drawing Sheets

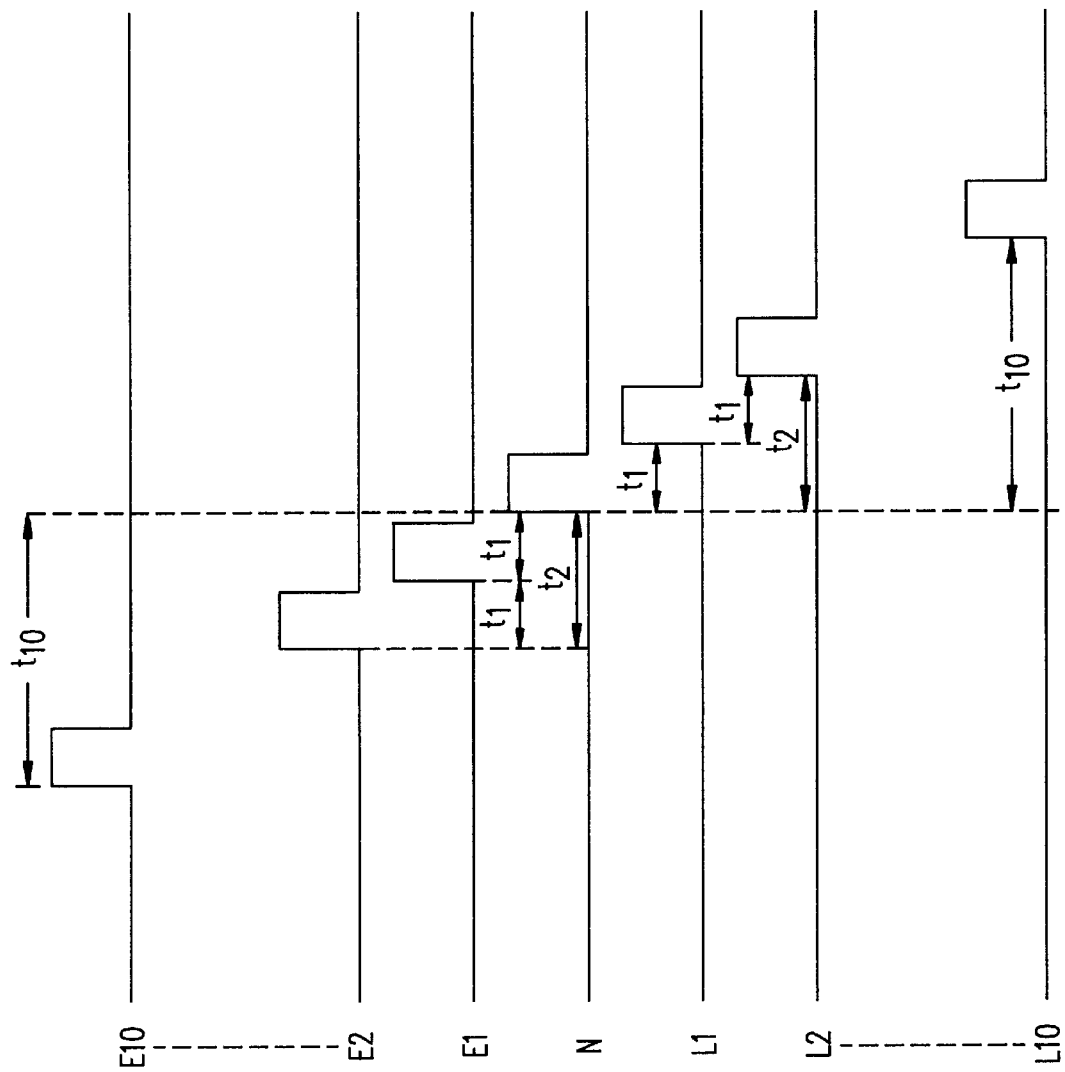

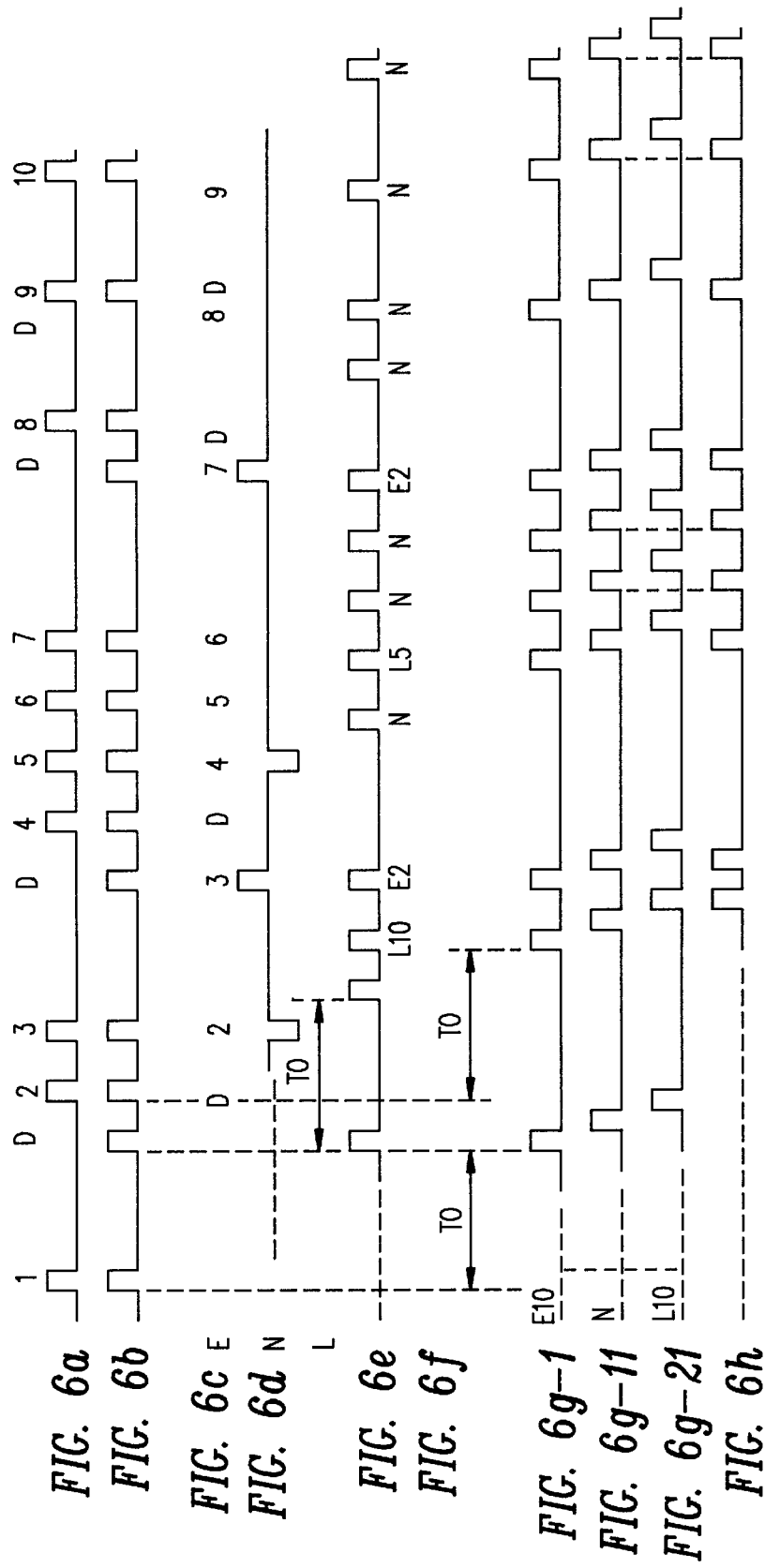

| TIMING TABLE | | |
|---|---|---|
| AREA 72A1 | AREA 72A2 | AREA 72A3 |
|  |  |  |

72A

| AMPLITUDE TABLE | | |
|---|---|---|
| AREA 72B1 | AREA 72B2 | AREA 72B3 |
|  |  |  |

72B

APPARATUS AND METHOD FOR CORRECTING A READ SIGNAL IN A DISK DRIVE SYSTEM BASED UPON A FRONT PEAK, A BACK PEAK AND A PEAK OF INTEREST

BACKGROUND OF THE INVENTION

1. Technical Field

This invention relates in general to signal processing, and in particular to an apparatus and method for correcting the peak position of pulses in a read signal in a data storage device.

2. Description of the Background Art

Magnetic head disk drive systems have been widely accepted in the computer industry as a cost effective form of data storage. In a magnetic disk drive system, a magnetic recording medium, in the form of a disk, rotates at high speed while a magnetic read/write transducer, referred to as a magnetic head, "flies" slightly above the surface of the rotating disk. A spindle drive motor rotates the magnetic disk. The magnetic head is attached to, or formed integrally with, a "slider" which is suspended over the disk by a spring-loaded suspension attached to a support arm known as the actuator arm. As the magnetic disk rotates at operating speed, the moving air generated by the rotating disk in conjunction with the physical design of the slider, operates to lift the magnetic head allowing it to glide or fly slightly above and over the disk surface on a cushion of air, referred to as an air bearing. The flying height of the magnetic head over the disk surface is typically only a few microinches or less and is primarily a function of disk rotation speed, the aerodynamic properties of the slider assembly and the force exerted by the spring-loaded actuator arm.

In a magnetic storage system, the information is stored digitally. The digital information is magnetically stored on the surface of the disk in a set of concentric circular patterns called "tracks." Typically, the magnetic head comprises a read head and a write head. The write head stores the digital information on the disk by selectively polarizing the disk surface. To write information, electrical circuity prepares an input signal to be sent to the write head. When reading the information stored on the disk, the read head senses the polarization of the disk surface and outputs an electrical signal corresponding to the magnitude and direction of the polarization. The read head outputs a signal corresponding to the magnitude and direction of the sensed magnetic field. Electrical circuity receives the output signal from the read head and prepares the signal for subsequent processing.

If a single item of data is written on the magnetic disk, the waveform of the read signal is a solitary wave which is unaffected by the magnetic fields of adjacent data. However, when a plurality of data pulses are stored on the magnetic disk, the magnetic forces of adjacent data influence each other in the read signal.

At low storage densities, the data are spaced some degree apart and magnetic forces of adjacent data have little influence on each other. Therefore, the magnitude and position of a peak in the read signal are unaffected by adjacent data. Referring to FIG. 12a, diagrams of waveforms are shown. In FIG. 12a, the dashed line represents the unaffected waveform S0. The solid line represents the waveform at low storage density S1. The magnitudes $y_{11}$ and $y_{12}$ of S1 are smaller than the magnitudes $y_0$ of S0. The peak positions $t_{01}$ and $t_{02}$ of signals S0 and S1 are equal.

Typically, a large number of data bits are stored on the magnetic disk and the storage density is high. Therefore, the influence of magnetic forces from adjacent data is high. Referring to FIG. 12b, diagrams of waveforms are shown. In FIG. 12b, the dashed line represents the waveform S0 uninfluenced by adjacent magnetic forces, and the solid line represents the waveform at high storage density S1. The magnitudes $y_1'$ and $y_2'$ of the peaks of the waveform S1 are smaller than the magnitudes $y_0$ of the peak of the uninfluenced waveform S0. The peak positions $t_1'$ and $t_2'$ of the reading waveform S1 are shifted from the peak positions $t_1$ and $t_2$ of the uninfluenced waveform S0.

The loss of magnitude and the peak shift cause errors in reading the data. To reduce the influence of interference of adjacent magnetic forces, the storage density is limited and an improvement in the storage density is limited. In the prior art, to reduce peak shift in the read signal, the signal is pulse-slimmed by an equalizer during the write operation. Using pulse-slimming, the write signal becomes a slim, standing waveform which does not interfere with other signals. Another method to reduce peak shift, called precompensation, shifts the read signal in advance in the direction opposite to the direction that the signal is shifted when read. Precompensation is done during the write operation.

In the prior art, the read signal itself is corrected by pulse-slimming or precompensation, so the signal-to-noise (S/N) ratio of the read signal is deteriorated. Therefore, there is a need for an apparatus and method which reduces the deterioration of the S/N ratio.

SUMMARY OF THE INVENTION

It is therefore an object of the present invention to provide a read signal correction apparatus and method which corrects the peak position in a read signal to an accurate position.

It is a further object of the present invention to provide a read signal correction apparatus and method which reduces deterioration of the S/N ratio of a read signal.

The foregoing objects are achieved by the invention which comprises a read signal correction circuit for correcting the peak position of a plurality of peaks in a read signal. The read signal correction circuit comprises an amplitude sensor, shift detector, and shift corrector. The amplitude sensor takes its input from the peak detector which detects the magnitude and position of each of a plurality of peaks in a read signal. The amplitude sensor senses the threshold level corresponding to the magnitude of a peak. The shift detector obtains a direction and amount of shift for a peak of interest with respect to a reference position. The direction and amount of shift is based on the threshold levels of the peak of interest, the front peak and the back peak. The shift corrector corrects the position of the peak of interest based on the obtained direction and amount of shift.

In the present invention, the amount of shift of the peak of interest with respect to a reference value is obtained based on the difference of the threshold levels of the front and back peaks.

The read signal correction method detects the magnitude and position of a plurality of peaks in a read signal. The method senses the threshold level corresponding to the magnitude of a peak. The method obtains a direction and amount of shift for the peak of interest. The direction and amount of shift is based on the magnitude of the peak of interest, the magnitudes of peaks positioned before and after the peak of interest, and a reference position for the peak of interest. In addition, the method corrects the position of the peak of interest, based on the obtained direction and amount of shift.

The amount of shift of the peak of interest with respect to a reference value is obtained based on the difference between the magnitudes of the peaks before and after the peak of interest.

In an alternative embodiment, the amount of shift of the peak of interest with respect to a reference value is obtained based on the ratio between the magnitudes of peaks positioned before and after the peak of interest.

Also, the read signal correction apparatus of the present invention comprises a detector, a level sensor, a direction detector, and a corrector. The detector detects a magnitude and position of each of a plurality of peaks of a read signal of a time series of data stored on a magnetic disk. The level sensor detects which of a plurality of threshold levels the detected magnitude of each of a plurality of peaks corresponds to and outputs a signal corresponding to the threshold level. The maximum threshold level of said plurality of threshold levels corresponds to a predetermined reference value. The direction detector obtains a direction of shift of a peak positioned in said predetermined position with respect to a reference position based on the signals corresponding to said peak and peaks positioned before and after said peak which were output by the level sensor. The corrector corrects the position of said peak positioned in said predetermined position, based on the direction of shift detected by said direction detector and on the threshold levels of said peaks positioned before and after said peak positioned in said predetermined position. The read signal correction apparatus of the present invention is included in a magnetic disk.

In addition, the read signal correction method of the present invention comprises the steps of detecting a magnitude and position of each of a plurality of peaks of a read signal of a time series of data stored on a magnetic disk, obtaining, based on a magnitude of a peak positioned in a predetermined position and magnitudes of peaks positioned before and after said peak, a direction and amount of shift of said peak positioned in said predetermined position to a reference position, and correcting the position of said peak positioned in said predetermined position, based on the obtained direction and the obtained amount of shift.

In the present invention, the amount of shift is obtained based on the difference between the magnitudes of the peaks positioned before and after the peak of interest. Alternatively, the amount of shift is obtained based on the ratio of the magnitudes of the peaks positioned before and after said peak of interest.

Furthermore, a read signal correction method of the present invention comprises the steps of detecting a magnitude and position of each of a plurality of peaks of a read signal of a time series of data stored on a magnetic disk, detecting which of a plurality of threshold levels the detected magnitude of each of a plurality of peaks corresponds to, the maximum threshold level of said plurality of threshold levels corresponding to a predetermined reference value, outputting a signal representative of a threshold level corresponding to the detected magnitude of each of a plurality of peaks, obtaining, based on the output signal corresponding to a peak positioned in a predetermined position and on output signals corresponding to peaks positioned before and after said peak, a direction of shift of said peak positioned in said predetermined position to a reference position, and correcting a position of said peak positioned in said predetermined position based on the detected direction of shift and on the detected threshold levels of said peaks positioned before and after said peak positioned in said predetermined position.

Operation

In the read signal correction apparatus of the present invention, the detector detects the magnitude and position of each of a plurality of peaks of a read signal of a time series of data stored on a magnetic disk.

If the peak position of the read signal is not influenced by magnetic forces from adjacent data stored on the magnetic disk, or if the magnetic influence is small, then the peak position is not shifted from a reference position, such as the original position. However, if the magnetic influence is large, then the peak position of the read signal will be shifted. The shift of the peak position of the read signal is represented by a direction and amount of shift with respect to a reference position.

The above-described direction of shift of the peak position depends upon the magnitudes of a plurality of peaks of the read signal, that is, the magnitude of a peak positioned in a predetermined position (hereinafter also referred to as a peak of interest), the magnitude of a peak positioned to the front of the peak of interest (hereinafter also referred to as a front peak), and the magnitude of a peak positioned to the back of the peak of interest (hereinafter also referred to as a back peak). In particular, if the magnitude of the front peak is greater than the magnitude of the back peak, the influence of the magnetic force of the magnetic disk from the back peak will be large. Therefore, the peak of interest will be shifted towards the front peak. If the magnitude of the back peak is greater than the magnitude of the front peak, the influence of the magnetic force from the front peak will be large, so the peak of interest will be shifted towards the back peak. Therefore, the direction of shift of the peak of interest to a reference position is obtained by the magnitudes of a plurality of peaks.

Also, the amount of shift of the peak position of the read signal is obtained based on the magnitudes of the front and back peaks.

For example, if the space between the peak of interest and the front peak is the same as the space between the peak of interest and the back peak, the influence between the peak of interest and the front peak will be equal to the influence of the peak of interest and the back peak. The influence between the peak of interest and the front peak is also referred to as a front magnetic force. The influence between the peak of interest and the back peak is also referred to as a back magnetic force. Since the front and back magnetic forces are equal, the magnitudes of the front and back peaks are equal and the position of the peak of interest is equal to the reference position.

The above-described peak spaces also differ. For example, when the peak space between the peak of interest and the front peak is greater than the peak space between the peak of interest and the back peak, the back magnetic force is greater than the front magnetic force. Therefore, the position of the peak of interest is shifted towards the front peak side. At the same time, the reduction in the back peak by the back magnetic force is greater than the reduction in the front peak by the front magnetic force. Similarly, when the peak space between the peak of interest and the front peak is smaller than that between the peak of interest and the back peak, the front magnetic force is greater than the back magnetic force. Therefore, the position of the peak of interest is shifted towards the back peak side. At the same time, the reduction in the front peak by the front magnetic force is greater than the reduction in the back peak by the back magnetic force.

Thus the reason that the position of the peak of interest is shifted towards the front or back peak side is that the back magnetic force is either greater or smaller than the front magnetic force. Therefore, the amount of shift of the peak of interest position corresponds to the difference between the front magnetic force and the back magnetic force. Also, the back magnetic force corresponds to the reduction in the back peak, and the front magnetic force corresponds to the reduction in the front peak. Therefore, the amount of shift of the peak of interest's position is obtained based on the difference between the magnitudes of the front and back peaks. In addition, since the difference between the magnitudes of the front and back peaks corresponds to the ratio between the magnitudes of the front and back peaks, the amount of shift of the peak of interest's position is obtained based on the ratio between the magnitudes of the front and back peaks.

Therefore, the amount of shift of the peak position of the read signal from a reference position can be obtained based on the difference between the magnitudes of the peaks before and after the peak of interest or the ratio between the magnitudes of the peaks before and after the peak of interest.

The shift corrector obtains, based on the magnitude of a peak positioned in a predetermined position and the magnitudes of peaks positioned before and after the peak, a direction and amount of shift of the peak positioned in the predetermined position with respect to a reference position. The shift corrector corrects the position of the peak positioned in the predetermined position based on the obtained direction and amount of shift.

Also, in a read signal correction method of the present invention, the magnitude and position of each of a plurality of peaks of a read signal of a time series of data stored on a magnetic disk are detected. Based on the magnitude of a peak positioned in a predetermined position and magnitudes of peaks positioned before and after the peak, the direction and amount of shift of the peak positioned in the predetermined position with respect to a reference position are obtained.

The amount of shift of the peak positioned in a predetermined position is obtained based on a difference between said magnitudes of peaks positioned before and after the peak. Alternatively, the amount of shift of the peak positioned in a predetermined position is obtained based on a ratio between magnitudes of peaks positioned before and after the peak.

Furthermore, the position of the peak positioned in a predetermined position is corrected based on the obtained direction and amount of shift.

As described above, the present invention corrects the position of a peak positioned in a predetermined position based on the direction and amount of shift of the peak positioned in a predetermined position with respect to a reference position. The reference position is obtained based on the magnitude of said peak and the magnitudes of the peaks positioned before and after said peak. Therefore, the amplitude of a predetermined peak in the read signal is neither increased nor decreased. Hence, a deterioration in the S/N ratio is reduced and the position of a peak in the read signal is corrected to an accurate position.

In a read signal correction apparatus of the present invention, the detector detects a magnitude and position of each of a plurality of peaks of a read signal of a time series of data stored on a magnetic disk.

The level sensor detects which of a plurality of threshold levels the detected magnitude of each of a plurality of peaks corresponds to, and outputs a signal representative of a corresponding threshold level. The maximum threshold level of said plurality of threshold levels corresponds to a predetermined reference value.

The direction detector detects a direction of shift of a peak positioned in a predetermined position with respect to a reference position, based on the signals corresponding to said peak and peaks positioned before and after said peak which were output by said level sensor.

The amount of shift of a peak positioned in a predetermined position is detected from either the difference or the ratio between the magnitudes of peaks positioned before and after the peak positioned in a predetermined position. Therefore, the amount of shift of a peak is obtained from the threshold levels of the peaks positioned before and after the peak positioned in a predetermined position.

The shift corrector corrects a position of said peak positioned in said predetermined position, based on the direction of shift detected by said direction detector and based on the threshold levels of the peaks positioned before and after said peak.

In addition, in the read signal correction method of the present invention, the magnitude and position of each of a plurality of peaks of a read signal of a time series of data stored on a magnetic disk are detected. The method detects which of a plurality of threshold levels the detected magnitude of each of a plurality of peaks corresponds to. The maximum threshold level of said plurality of threshold levels corresponds to a predetermined reference value. A signal representing a threshold level corresponding to the detected magnitude of each of a plurality of peaks is output. Based on the output signal corresponding to a peak positioned in a predetermined position and on output signals corresponding to peaks positioned before and after said peak, a direction of shift of said peak positioned in said predetermined position with respect to a reference position is obtained. The position of said peak positioned in said predetermined position is corrected based on the detected direction of shift and on the detected threshold levels of said peaks positioned before and after said peak positioned in said predetermined position.

As described above, the present invention corrects the position of the peak positioned in a predetermined position, based on the detected direction of shift and on the detected threshold levels of the peaks positioned before and after the peak positioned in a predetermined position. Therefore, the amplitude of the peak in the read signal is neither enlarged nor contracted. Therefore, deterioration in the S/N ratio is reduced and the peak position of the read signal is corrected to an accurate position.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a timing diagram of the pulses output from the delay circuit which are input to the multiplexer (MUX);

FIGS. 6a–6f, 6g-1, 6g-21, and 6h are timing diagrams of the operation of the correction circuit;

FIG. 7 is a block diagram of a magnetic disk unit in an alternative embodiment;

FIG. 8 illustrates a timing table provided in a RAM;

FIG. 9 illustrates an amplitude table provided in a RAM;

FIG. 11 is a graph showing the relationship between the amount of peak shift in a RBS and the difference between the magnitudes of the front and back peaks;

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 1:
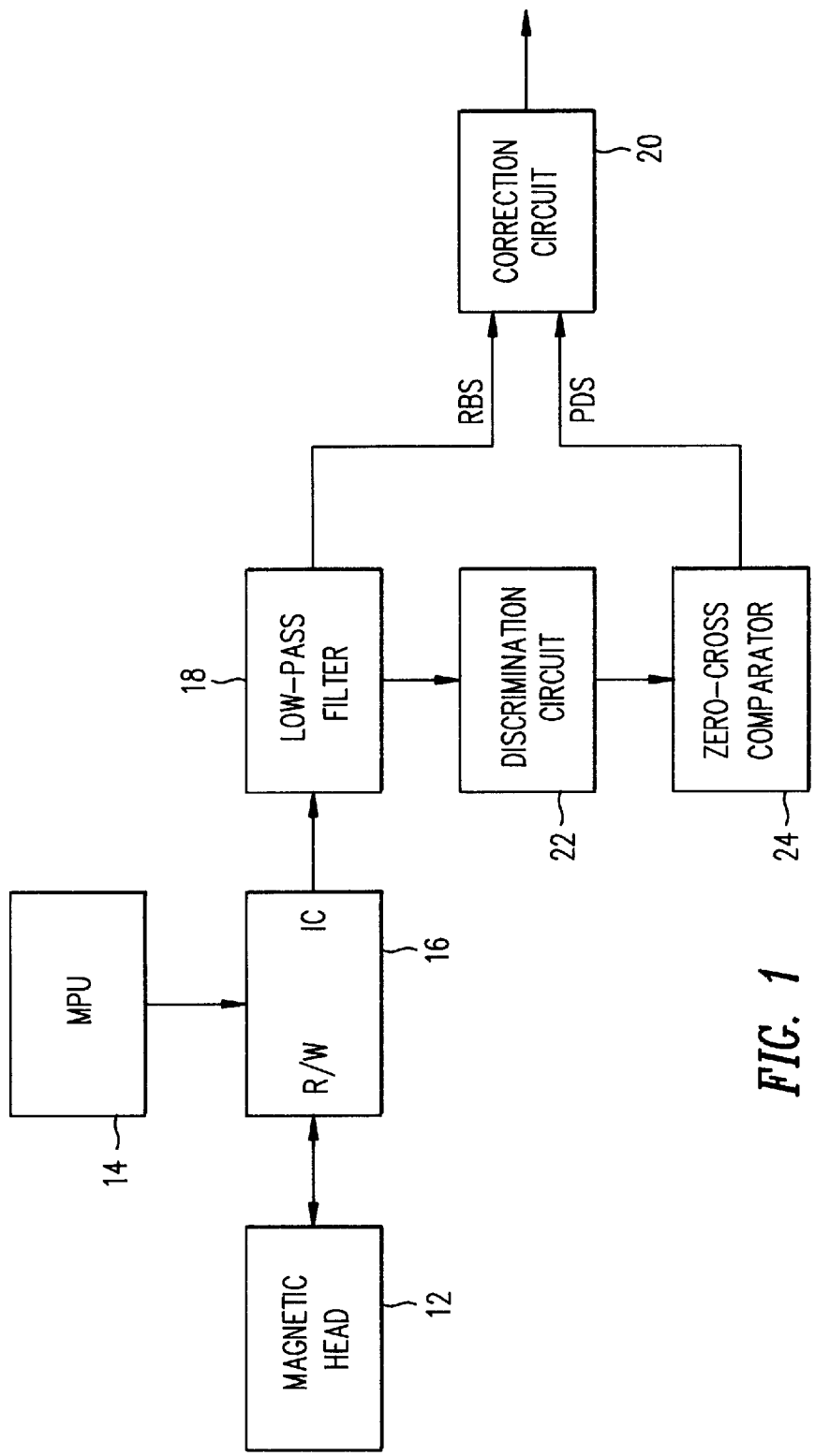
FIG. 1 is a block diagram of a magnetic disk unit.

With reference now to FIG. 1, a magnetic disk unit in the present embodiment is shown. The magnetic disk unit comprises a magnetic head 12, a read/write integrated circuit (R/W IC) 16, a low-pass filter 18, and a microprocessing unit (MPU) 14.

In response to the control of the MPU 14, the R/W IC 16 controls the magnetic head 12 for read/write operations. A spindle motor (not shown) rotates the magnetic disk. Data is read from and written to the rotating magnetic disk. The R/W IC 16 connects to a low-pass filter 18. The low-pass filter 18 cuts high-frequency noise in the read signal from the magnetic head. Because the read-back signal (RBS) is a low-frequency component of the read signal, the low-pass filter allows the RBS to pass through. The low-pass filter 18 connects to a correction circuit 20, and the RBS is input from the low-pass filter 18 to the correction circuit 20.

The low-pass filter 18 connects to a discrimination circuit 22. The discrimination circuit 22 connects to a zero-cross comparator 24. The zero-cross comparator 24 connects to the correction circuit 20. The RBS is input from the low-pass filter 18 to the discrimination circuit 22, which discriminates the RBS and outputs the discriminated RBS signal to the zero-cross comparator 24. The zero-cross comparator 24 detects the zero-cross point of the RBS. The zero-cross comparator 24 outputs a peak detection signal (PDS) corresponding to the peaks of the RBS. The zero-cross comparator 24 outputs the PDS to the correction circuit 20.

Figure 2:
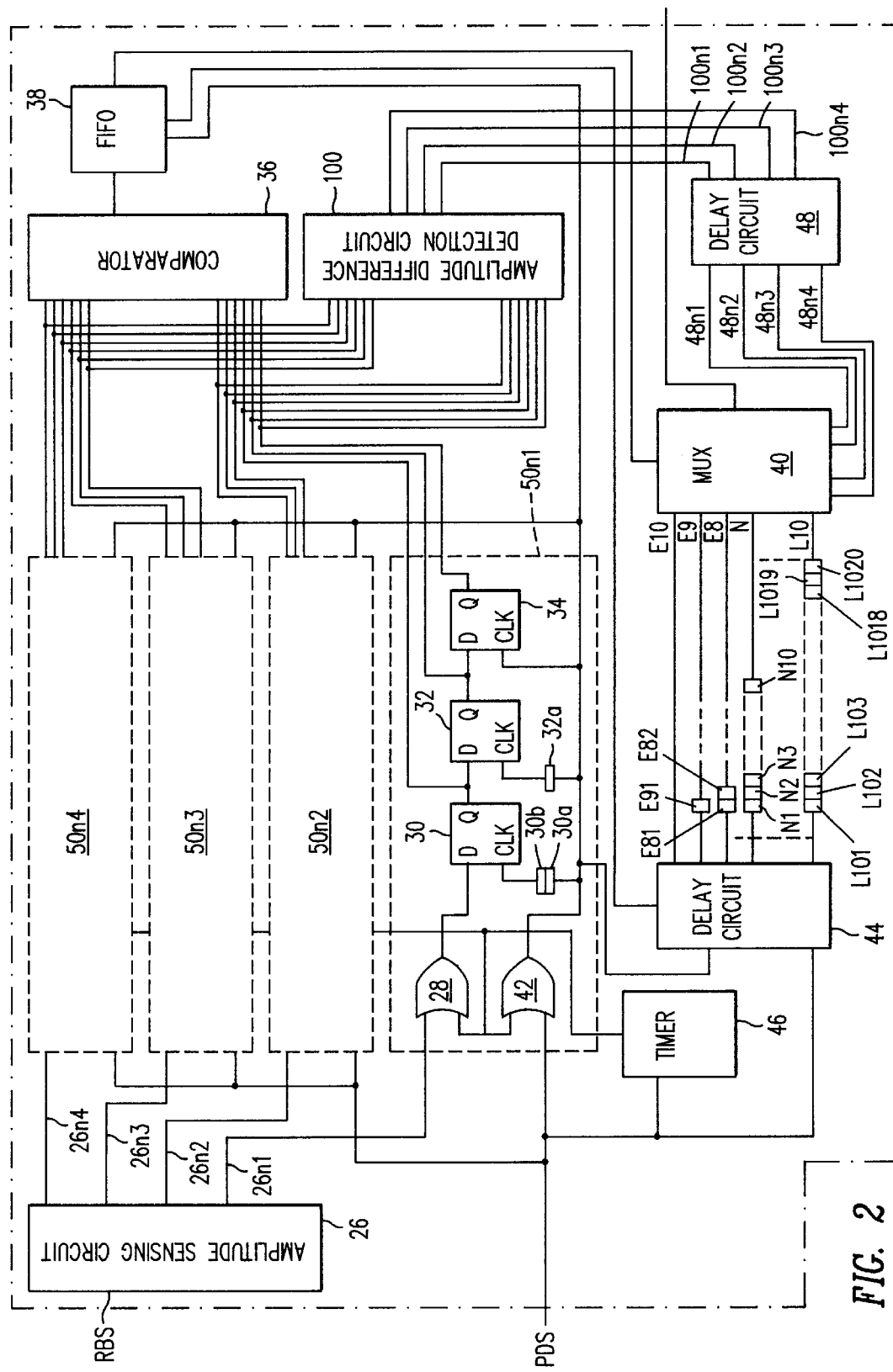
FIG. 2 is a circuit diagram showing the details of the correction circuit.

Referring now to FIG. 2, a correction circuit 20 is shown. Correction circuit 20 comprises an amplitude sensing circuit 26. The RBS is input to the amplitude sensing circuit 26. Amplitude sensing circuit 26 comprises four output lines 26n1 to 26n4. In addition, correction circuit 20 comprises a first circuit 50n1, a second circuit 50n2, a third circuit 50n3, and a fourth circuit 50n4. Because first 50n1, second 50n2, third 50n3, and fourth circuits 50n4 are identically constructed, first circuit 50n1 will hereinafter be described and a description of second 50n2, third 50n3, and fourth circuits 50n4 will be omitted.

The first circuit 50n1 comprises an OR gate 28. An input terminal of OR gate 28 connects to the output line 26n1 of amplitude sensing circuit 26. The first circuit 50n1 also comprises OR gate 42. The PDS is input to an input terminal of OR gate 42. A timer 46 connects to the other input terminal of OR gate 28 and to the other input terminal of OR gate 42. The output lines 26n2, 26n3, and 26n4 of the amplitude sensing circuit 26 connect to the OR gate 28 of the second, third, and fourth circuits 50n2, 50n3, and 50n4 (not shown), respectively.

The output terminal of OR gate 28 connects to the data terminal D of flip-flop 30. The output terminal Q of flip-flop 30 connects to the data terminal D of flip-flop 32, the comparator 36, and an amplitude difference detection circuit 100. The output terminal Q of flip-flop 32 connects to the data terminal D of flip-flop 34, the comparator 36, and the amplitude difference detection circuit 100. The output terminal Q of flip-flop 34 connects to the comparator 36 and the amplitude difference detection circuit 100.

The output terminal of OR gate 42 connects through delay elements 30a and 30b to the clock terminal clk of flip-flop 30, connects through delay element 32a to the clock terminal clk of flip-flop 32, and connects to the clock terminal clk of flip-flop 34. The output terminal of OR gate 42 also connects to the first input terminal of a first-in first-out buffer (FIFO) 38 and to the first input terminal of delay circuit 44.

The PDS is also input to an input terminal of delay circuit 44 and a timer 46. The timer 46 begins timing when a peak is input. If another peak is not input within a predetermined period of time T0, the timer 46 outputs a logic high dummy pulse to OR gate 28 and OR gate 42. The first output terminal of the delay circuit 44 connects to the second input terminal of the FIFO 38.

The amplitude difference detection circuit 100 is connected through output lines 100n1, 100n2, 100n3, 100n4 to a delay circuit 48. The delay circuit 48 delays input signals for a predetermined time. After a predetermined time, the delay circuit 48 outputs the signals on its input terminals 100n1, 100n2, 100n3, 100n4 to the delay circuit output lines 48n1, 48n2, 48n3, 48n4 respectively.

The output of comparator 36 connects to the input terminal of the FIFO 38. The output terminal of the FIFO 38 connects to a multiplexer (MUX) 40. The MUX 40 connects to the output lines 48n1, 48n2, 48n3, 48n4 of the delay circuit 48.

The delay circuit 44 connects to the MUX 40 through 21 delay lines, E10 to E1, N, L1 to L10. Delay line E9 has one delay element E91, delay line E8 has two delay elements E81, E82, and delay line E1 has nine delay elements (not shown). Delay line N has 10 delay elements N1 to N10. Delay line L10 has 20 delay elements L101 to L1020.

The amplitude sensing circuit 26 will now be described in detail. The RBS is input to the amplitude sensing circuit 26. The amplitude sensing circuit 26 senses the magnitude of a peak in the RBS. In the present embodiment, the amplitude sensing circuit 26 has 10 equally spaced threshold levels TL1 to TL10. The threshold level TL10 are formed by mapping the maximum threshold level (TL) to a predetermined reference or normal value. The normal value corresponds to the magnitude of the peak of the RBS in the case when there is no interference from surrounding bits. The normal value is divided into 10 levels to correspond to the 10 threshold levels of the amplitude sensing circuit. Assuming the levels are spaced at an amplitude value A0 apart, then amplitude value 0 corresponds to TL0, the amplitude value A0 corresponds to TL1, the amplitude value 2·A0 corresponds to TL2, the amplitude value 3·A0 corresponds to TL3, . . . , and the amplitude value 10·A0 (normal value) corresponds to TL10.

Each of the ten steps of TL0 to TL10 can be represented by 4 bits. Therefore the amplitude sensing circuit is provided with four output lines $26n1$, $26n2$, $26n3$, $26n4$ of amplitude sensing circuit 26. By the combination of the four output lines $26n1$ to $26n4$ for outputting a logic high pulse, each of the ten steps of TL0 to TL10 is represented as shown in Table 1. In Table 1, the output line to which a logic high pulse is output is represented by H, and the output line to which a logic high pulse is not output is represented by an L.

TABLE 1

|  | 26n1 | 26n2 | 26n3 | 26n4 |
| --- | --- | --- | --- | --- |
| TL10 | H | L | H | H |
| TL9 | H | L | H | L |
| TL8 | H | L | L | H |
| TL7 | H | L | L | L |
| TL6 | L | H | H | H |
| TL5 | L | H | H | L |
| TL4 | L | H | L | H |
| TL3 | L | H | L | L |
| TL2 | L | L | H | H |
| TL1 | L | L | H | L |
| TL0 | L | L | L | H |

When the magnitude of a peak of the RBS is greater than or equal to TL(I) (I=0 to 10) and less than TL(I+1), as shown in Table 1, the amplitude sensing circuit 26 outputs a logic high pulse corresponding to TL(I) to the output lines $26n1$ to $26n4$, as shown in Table 1.

The comparator 36 outputs a pulse representative of a direction of shift with respect to the reference position (original position) of the peak position of the RBS, based on a pulse input from flip-flops 30, 32, 34 of first, second, third and fourth circuits $50n1$, $50n2$, $50n3$, $50n4$.

The method of detecting the direction of shift with respect to a reference position will be described. As stated above, the amplitude sensing circuit 26 maps the magnitude of a peak to a threshold level by outputting a logic high pulse on a combination of the four output lines $26n1$, $26n2$, $26n3$, $26n4$ (as shown in Table 1). The four output lines $26n1$, $26n2$, $26n3$, $26n4$ connect to the first circuit $50n1$, second circuit $50n2$, third circuit $50n3$, and fourth circuit $50n4$, respectively. Therefore, the combination of the flip-flops 30, 32, and 34 of first, second, third, and fourth circuits, $50n1$ to $50n4$, stores the threshold level TL0 to TL10 corresponding to the magnitude of a peak in the RBS.

Figure 3:
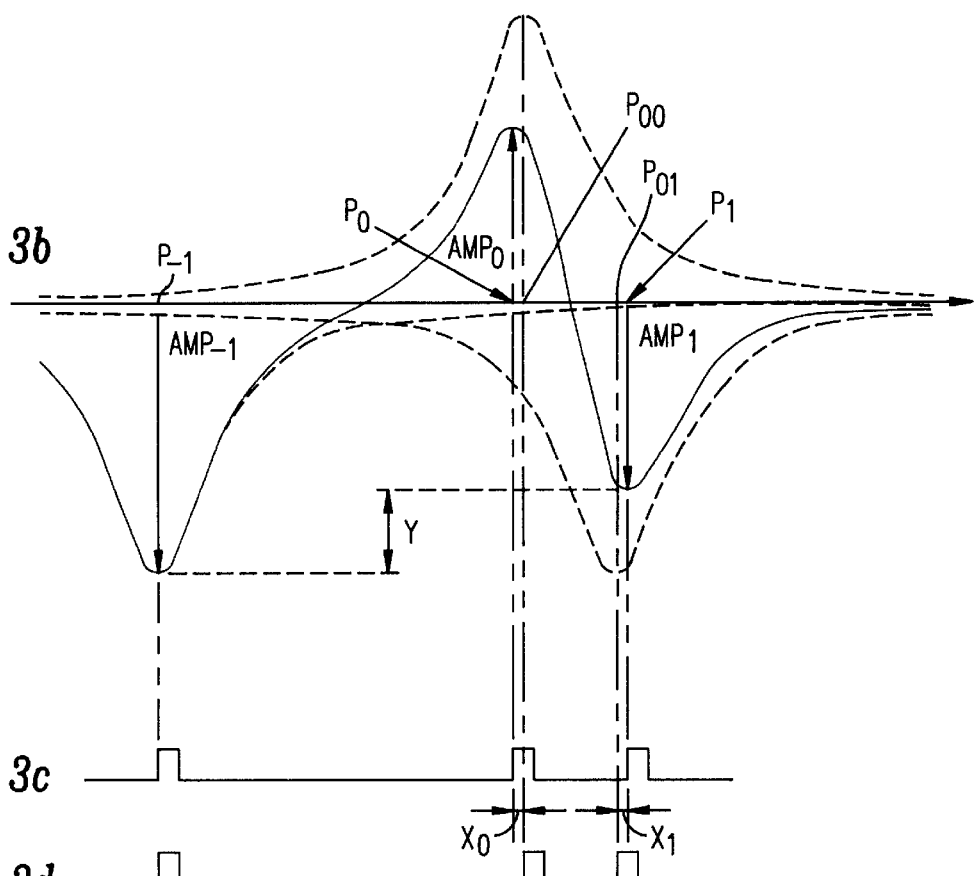
FIG. 3a is a diagram showing data stored on a magnetic disk.
FIG. 3b is a diagram showing a readback signal of the data of FIG. 3a and a readback signal unaffected by other signals.
FIG. 3c is a diagram showing a peak detection signal (PDS) corresponding to the peak positions in the readback signal.
FIG. 3d is a diagram showing the original (unaffected) position of the PDS.

Referring now to FIG. 3b, a diagram of a signal comprising three RBSs is shown. Assume that the magnitude of the peak of the first RBS is $AMP_{-1}$, the magnitude of the peak of the second RBS is $AMP_0$, and the magnitude of the peak of the third RBS is $AMP_1$. Also assume that:

$$X1 = |AMP_{-1} - AMP_0|P \quad (1)$$

$$X2 = |AMP_0 - AMP_1|P \quad (2)$$

If the magnitude of the peak of the first RBS, $AMP_{-1}$, is greater than the magnitude of the peak of the third RBS, $AMP_1$, that is X1>X2, then the influence of the magnetic force of the first RBS is greater than the influence of the magnetic force of the third RBS. Therefore, the peak position of the second RBS is shifted towards the first pulse. The direction of time is the forward direction (early). If the magnitude of the peak of the third RBS, $AMP_1$, is greater than the magnitude of the peak of the first RBS, $AMP_{-1}$, that is X1<X2, then the influence of the magnetic force of the first data is greater than the influence of the magnetic force of the third data. Therefore, the peak position of the second RBS is shifted towards the third pulse. The direction of time is the backward direction (late). If the magnitude of the peak of the first RBS, $AMP_{-1}$, and the magnitude of the peak of the third RBS, $AMP_1$, are the same, that is X1=X2, then the influence of the magnetic force of the first RBS and the third RBS are equal. Therefore, the peak position of the second RBS corresponds to the original position.

Referring to FIG. 2, the combination of flip-flops 30, 32, 34 of the first, second, third and fourth circuits $50n1$, $50n2$, $50n3$, $50n4$ stores information about the magnitude of three consecutive RBSs. Therefore, flip-flops 30, 32, 34 of the first through fourth circuits indicate whether the three consecutive RBSs corresponds to X1>X2, X1<X2, or X1=X2.

If X1>X2, then the peak position of the RBS is shifted in direction of time in the forward direction. Therefore, the comparator 36 outputs a logic high or an "H" pulse representative of that shift direction. If the state corresponds to X1<X2, then the peak position of the RBS is shifted in the direction of time in the backward direction. Therefore, the comparator 36 outputs a not-logic high or "−H" pulse representative of that shift direction. If X1=X2, then no pulse is output.

The amplitude difference detection circuit will now be described. Referring now to FIG. 3b, the MUX selects a pulse corresponding to the amount of shift of a peak positioned in a predetermined position (peak of interest). The amplitude difference detection circuit 100 obtains a value equal to the absolute value of the difference between the magnitudes of the front and back peaks, that is, ($|AMP_{-1} - AMP_1|$) of a difference Y between the magnitudes of the front and back peaks. The amplitude difference detection circuit 100 outputs the result of the absolute value to the MUX 40 to select the corresponding amount of shift. In the present embodiment, the amplitude sensing circuit 26 outputs a logic high pulse to at least any of the output lines $26n1$, $26n2$, $26n3$, $26n4$, and indicates the magnitude, TL0 to TL10, of a peak of the corresponding RBS. Therefore, the difference between the magnitudes of the front and back peaks is a difference (step number of TL) between the threshold levels TL corresponding to the magnitudes of the front and back peaks.

Figure 4:
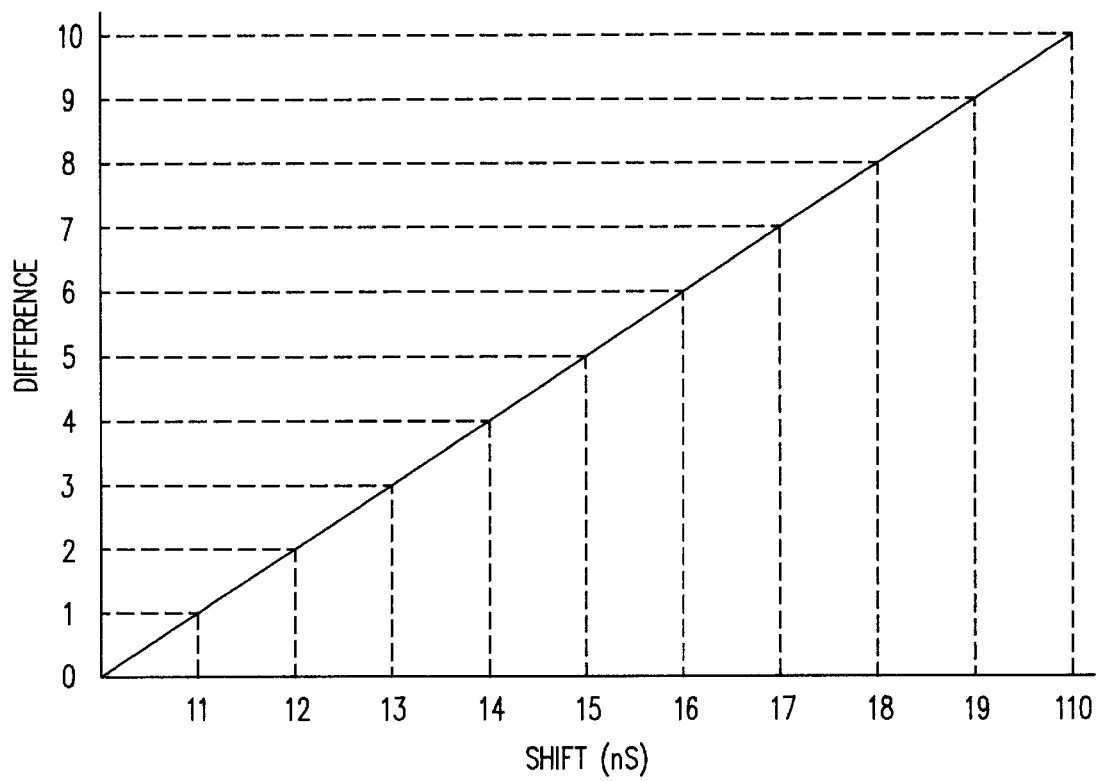
FIG. 4 is a graph showing the relationship between the amount of peak shift of a readback signal (RBS) and the difference between threshold levels (TL) of the magnitudes of the front and back peaks.

Referring now to FIG. 4, in multiple experiments, it was found, for the relationship between an amount of shift (nS) from the reference position and the difference (step number of TL) between TL corresponding to the magnitudes of the front and back peaks, that in many cases the amount of shift increases as the step number increases. That is, each time the step number increases by one step, the amount of shift (nS) increases by {t1 (nS)−0(nS)}.

The difference between threshold levels TL corresponding to the magnitudes of the front and back peaks ranges from 0 to the maximum of the tenth step number. Each of the 0 to tenth step numbers are represented by four bits. Therefore, the amplitude difference detection circuit 100 is provided with four output lines $100n1$, $100n2$, $100n3$, $100n4$. As shown in Table 2 below, each of the ten steps is represented by outputting a logic high pulse on a combination of the four output lines $100n1$ to $100n4$. In Table 2, the output line to which a logic high pulse is output is represented by "H" and the output line to which a logic high pulse is not output is represented by "L."

TABLE 2

| Step number | 100n1 | 100n2 | 100n3 | 100n4 |
|---|---|---|---|---|
| 10 | H | L | H | H |
| 9 | H | L | H | L |
| 8 | H | L | L | H |
| 7 | H | L | L | L |
| 6 | L | H | H | H |
| 5 | L | H | H | L |
| 4 | L | H | L | H |
| 3 | L | H | L | L |
| 2 | L | L | H | H |
| 1 | L | L | H | L |
| 0 | L | L | L | H |

Referring to FIG. 2, the delay elements E91, E81, ..., L101, ..., and L1020 provided in the delay lines E9 to E1, N, and L1 to L10 will next be described. Each delay element E91, E81, ..., L101, ..., and L1020 delays an input pulse a predetermined time t1 (nS) before outputting it.

Referring also to FIG. 5, a timing chart of the pulses input to the MUX from the delay circuit is shown. The delay elements E91, E81, ..., L101, ..., and L1020 are provided in the delay lines E9 to E1, N, and L1 to L10 so that the MUX 40 can input the pulses in which the direction of time is delayed in either the forward (Early) or backward direction (Late) by t1 (nS). The timing of a pulse in the forward or backward direction is with respect to the timing of the pulse input through delay line N.

The delay circuit 44 outputs pulses to the delay lines E10 to E1, N, and L1 to L10 when a predetermined time T0 elapsed from the timing at which the above-described PDS was input. The MUX 40 inputs pulses that were delayed 10·t1 (nS) by the delay elements N1 to N10 in delay line N. Based on the timing of delay line N, the MUX 40 inputs pulses which are shifted in the forward direction by t1 (nS) on delay lines E1, E2, ..., and E10. In addition, the MUX 40 inputs pulses in which the directions of time are shifted in the backward direction by t1 (nS) on delay lines L1, L2, ..., and L10.

The amount of time from when a pulse is input through each of the delay lines E10, E9, ..., and E1 to when the pulse was input through the delay line N corresponds to an amount of shift as the difference (step number of TL) between the threshold levels TL corresponding to the magnitudes of the front and back peaks. The amount of shift is a function of the step number. The amount of shift decreases in steps from the tenth step. Similarly, the amount of time from when the pulse was input through the delay line N to the time when the pulse was input through each of the delay lines L1, L2, ..., and L10 corresponds to an amount of shift as the step number increases from 0 in increments of 1. Therefore, the MUX 40 inputs pulses which are shifted in both forward and backward directions by the amount of shift (nS) each time the step number increases from 0 by one step.

A description will next be made in reference to the operation of the magnetic disk unit. In response to the MPU 14, the R/W IC 16 (shown in FIG. 1) controls the magnetic head 12 to read and write from the rotating magnetic disk. A spindle motor rotates the magnetic disk (not shown). Referring to FIG. 3a, for example, a diagram of data stored on the magnetic disk is shown. Referring also to FIG. 3b, a diagram illustrating the read signal is shown. In FIG. 3b, the dotted lines illustrate the original value of the magnitude of the peak of the read signal where adjacent signals do not influence each other. However, in reality, the read signal is a waveform shown by the solid line in FIG. 3b because of the influence of adjacent magnetic forces corresponding to data stored on the disk. In particular, the magnitude of the peak of the read signal $AMP_{-1}$, $AMP_0$, $AMP_{-1}$ is reduced from the original value, and the peak position $P_0$, $P_1$ is shifted from the original position $P_{00}$, $P_{01}$. The R/W IC 16 inputs the read signal, with the a shifted peak position, to the low-pass filter 18. The low-pass filter 18 reduces the high-frequency noise and allows the RBS, a low-frequency component of the read signal, to pass through. The RBS is input to the correction circuit 20.

After passing though the low-pass filter 18, the RBS is also input to the discrimination circuit 22. After passing through the discrimination circuit 22, the zero-cross comparator 24 detects the zero-cross point of the signal and outputs the PDS to the correction circuit 20. Referring also to FIG. 3c, the PDS signal is shown. Referring also to FIG. 3d, the original peak positions are shown. The PDS is a signal corresponding to the position of the peak of the RBS, so the direction of time is shifted from the original peak positions (shown in FIG. 3d) in the forward and backward directions by $X_0$ and $X_1$ (nS) (shown in FIG. 3c).

Referring to FIGS. 6a through h, timing diagrams of the operation of the correction circuit are shown. In FIG. 6a, the PDS is input from the zero-cross comparator 24 to the correction circuit 20 having the timing shown, for example. The PDS is a signal corresponding to the peak position of the RBS, so the RBS is input from the low-pass filter 18 to the amplitude sensing circuit 26 with substantially the same timing as the PDS. FIG. 6a also shows the number of the PDS input. The PDS represented by a number k will hereinafter be referred to as the PDSk. The RBS corresponding to the PDSk will hereinafter be referred to as the RBSk.

The RBSk is first input to the amplitude sensing circuit 26, which detects the magnitude of the peak of the input RBSk and also detects which of TL0 to TL10 corresponds to the magnitude of the detected peak. Based on the TL0 to TL10 corresponding to the magnitude of the detected peak, a pulse is output according to Table 1 described above. For example, when the magnitude of the peak of the detected RBSk is not more than TL8 and not less than TL7, the amplitude sensing circuit 26 outputs a pulse only to the output line 26n1. Pulses output from the amplitude sensing circuit 26 to the output lines 26n1 to 26n4 are input to the OR gate 28 of the first circuits 50n1 to 50n4 respectively. The output of the OR gate 28 is input to the data terminal of flip-flop 30.

Alternatively, the PDSk is input to the OR gate 42 of the circuits 50n1 to 50n4, the timer 46, and the delay circuit 44.

The output of the OR gate 42 is the input to the clock terminal clk of flip-flop 34. After a predetermined time elapses from this time by the delay element 32a, the output of the OR gate 42 is input to the clock terminal clk of flip-flop 32. The output of the OR gate 42 is input to the clock terminal clk of flip-flop 30 after a further predetermined time elapses, by the delay elements 30a and 30b.

Flip-flop 34 latches the Q output of flip-flop 32 to the clock terminal clk input provided by the output of the OR gate 42. The Q output of flip-flop 32 is the pulse from the OR gate 28 corresponding to RBS(k−2); therefore, flip-flop 34 outputs to the comparator 36 and the amplitude difference detection circuit 100 the pulse from the OR gate 28 corresponding to RBS(k−2).

Flip-flop 32 latches the Q output of flip-flop 30 when the output of the OR gate 42 was input to the clock terminal clk of the flip-flop 32. The Q output of flip-flop 30 is the pulse from the OR gate 28 corresponding to RBS(k–1); therefore, flip-flop 32 outputs to the comparator 36 and the amplitude difference detection circuit 100 the pulse from the OR gate 28 corresponding to RBS(k–1).

Flip-flop 30 latches the pulse from the OR gate 28 corresponding to the RBSk when the output of the OR gate 42 was input to the clock terminal clk of flip-flop 30; therefore, flip-flop 30 outputs to the comparator 36 and the amplitude difference detection circuit 100 the pulse from the OR gate 28 corresponding to RBSk.

As described above, when the RBSk and the PDSk are input to the correction circuit 20, the comparator 36 comprises as inputs the pulses from the OR gate 28 corresponding to the RBS(k–2), the RBS(k–1), and the RBS(k), from at least one of the first through fourth circuits 50$n$1 to 50$n$4.

Based on the combination of the states of the first to fourth circuits corresponding to RBS(k–1), RBS(k–1), and RBS (k), when the magnitudes of the peaks of the RBS(k–2), the RBS(k–1), and the RBS(k) correspond to X1>X2, the comparator 36 outputs an "H" (logic high) pulse indicating that the peak position of the RBS(k–1) was shifted in a forward direction of time. When the combination of states corresponds to X1<X2, the comparator 36 outputs an "–H" pulse indicating that the peak position of the RBS(k–1) was shifted in a backward direction of time. When the combination of states corresponds to X1=X2, the comparator outputs an N pulse. The N pulse indicates that the peak position of the RBS(k–1) was not shifted in either direction of time.

The output of OR gate 42 is input to the FIFO 38. When the output of OR gate 42 is input, the FIFO 38 stores the pulse output from the comparator 36. The output of OR gate 42 is also input to the delay circuit 44. Referring to FIG. 6e, the delay circuit 44 outputs a pulse to the FIFO 38 after a predetermined time elapses from the time that the output of OR gate 42 was input. Referring to FIG. 6f, when the pulse from the delay circuit 44 is input to the FIFO 38, the FIFO outputs the stored pulse of the comparator 36 to the MUX 40.

The PDS(k–1) is also input to the delay circuit 44, which outputs pulses to the delay lines E10, E9, . . . , N, E1, E2, . . . , and E10 when a predetermined time T0 elapses from the time that the PDS(k–1) was input. Referring to FIG. 6g-1, a pulse is input to the MUX 40 through the delay line E10, when a predetermined time T0 elapses from the time that the delay circuit 44 input the pulse from the amplitude sensing circuit 26. Pulses are input through the delay lines E9, E8, . . . E1 in the order of the delay lines E9, E8, . . . E1, each time a predetermined time t1 elapses from the time that the pulse from the delay line E10 was input. Referring to FIG. 6g-11, The MUX 40 further inputs a pulse through the delay line N, when a predetermined time t1 elapses from the time that the pulse from the delay line E1 was input. Referring to FIG. 6g-21, pulses are input through the delay lines L1, L2, . . . L10 in the order of the delay lines L1, L2, . . . L10, each time a predetermined time t1 elapses from the time that the pulse from the delay line N was input.

In the MUX 40, the time that a pulse was input through the delay line N represents the time that the PDS(k–1) has no correction. The time corresponding to delay line N comprises 10·t1 time intervals from the time that the delay circuit 44 input the PDS(k–1).

The outputs of the output lines 100$n$1 to 100$n$4 of the amplitude difference detection circuit 100 are input to the MUX 40 by the delay circuit 48 after a certain time elapses. The combination of the output lines 48$n$1 to 48$n$4 indicates to the MUX 40 which the step number is in the difference between the magnitudes of the peaks of the RBS(k–1) and the RBS(k+1), based on Table 2 described above. Therefore, the MUX 40 knows the amount of shift to correct the peak position of the RBSk. From the output of FIFO 38, the MUX 40 also knows the direction of peak position shift of the RBS(k–1).

Referring to FIG. 6h, a timing diagram of the MUX 40 output pulse is shown. The MUX 40 outputs a pulse in which the peak position of the RBS(k–1) is corrected in the direction opposite to the direction of shift represented by the pulse from the FIFO 38. Based on the pulse representing the direction of peak position shift of the RBS(k–1) output from the FIFO 38 and on the combination of the pulses output on lines 48$n$1 to 48$n$4, the MUX 40 selects and outputs the pulse input from the delay lines E10, E9, . . . N, E1, E2, . . . , and E10.

For example, when the RBS6 and the PDS6 are input to the correction circuit 20, the output of the OR gate 42 of the first through fourth circuits, 50$n$1 to 50$n$4, corresponding to the RBS6 is input to the clock terminal clk of the flip-flop 34. Consequently, the Q output of flip-flop 34 outputs a pulse corresponding to the RBS4 to the comparator 36 and the amplitude difference detection circuit 100. The output of OR gate 42 corresponding to the PDS6 is delayed a predetermined time by the delay element 32$a$ and input to the clock terminal clk of the flip-flop 32. A pulse corresponding to the PDS5 is output from the Q output terminal of the flip-flop 32 to the comparator 36 and the amplitude difference detection circuit 100. The output of OR gate 42 is further delayed by the delay elements 30$a$ and 30$b$ and input to the clock terminal clk of flip-flop 30, and a pulse corresponding to the RBS6 is output from the Q output terminal of flip-flop 30 to the comparator 36 and the amplitude difference detection circuit 100.

The comparator 36 outputs a pulse representative of the direction of peak position shift of the RBS 5 to the FIFO 38, based on the combination of the flip-flops 30, 32, and 34 of the first circuit 50$n$1 to the fourth circuit 50$n$4 to which these RBS4 to RBS6 were output. Referring to FIG. 3d, in the present embodiment, because the peak position of the RBS5 corresponds to the original position, the pulse N is output.

The output of OR gate 42 to which the PDS 6 was input is also input to the FIFO 38 and, consequently, the FIFO 38 stores the output from the comparator 36. In this case the pulse N was output from the comparator 36, therefore the FIFO 38 stores the data corresponding to the pulse N. Referring to FIG. 6e, the delay circuit 44, to which the PDS5 was input, outputs a pulse to the FIFO 38 after a predetermined time elapses from the time that the PDS5 was input. Referring also to FIG. 6f, consequently, the FIFO 38 outputs the stored data. In this case the FIFO 38 has stored the data corresponding to the pulse N, therefore the FIFO outputs the data corresponding to the pulse N.

The PDS5 is also input to the delay circuit 44, which outputs pulses to the delay lines E10, . . . , N, . . . L10 after a predetermined time T0. As a result, the MUX 40 inputs these pulses at the timings shown in FIGS. 6g-1 to 6g-21.

If the RBS6 is input to flip-flops 30 to 34, the pulses corresponding to the RBS4 to RBS6 are output to the amplitude difference detection circuit 100. A pulse representative of the step number of TL corresponding to the difference between the magnitudes of the peaks of the RBS4 and the RBS6 is input from at least any of the output lines 100$n$1 to 100$n$4 of the amplitude difference detection circuit 100 to the delay circuit 48. The delay circuit 48 delays the input pulse a predetermined time. The delay circuit then outputs the delayed pulse to the delay line 48$n$1 to 48$n$4 corresponding to the output lines 100n1 to 100n4. As a result, the MUX 40 knows the step number of TL corresponding to the difference between the magnitudes of the peaks of the RBS4 and the RBS6. Therefore, the MUX 40 knows the amount of shift of the peak position of the RBS5. The amount of shift corresponds to the timing of a pulse that is input through the delay lines E10, . . . , N, . . . L10. If there is no information on the direction of peak position shift of the RBS5, the amount of shift is obtained by selecting a pulse of either of the delay line Ei or Li, or N, corresponding to that amount of shift. However, the FIFO 38 inputs a pulse representing of the direction of the peak position shift of the RBS5 to the MUX 40. Based on the pulse from the FIFO 38, the MUX 40 selects and outputs either of the delay line Ei or Li or N.

Since the amount of shift is 0 by the combination of the output lines 48n1 to 48n4 of the delay circuit 48, and the FIFO 38 indicates that the peak position of the RBS has not shifted in either the forward or backward direction of time, a pulse correcting the position of the PDS corresponding to the RBS5 is output by selecting and outputting a pulse input from the delay line N. Therefore, the peak position of the read signal is corrected to an accurate position.

The dummy pulse output by the timer 46 will be described. The dummy pulse is a logic high pulse that is output when a predetermined amount of time elapses between RBS pulses in the PDS. Referring to FIG. 6a, the individual RBS's are numbered FIG. 6a as 1 through 10. The "D" represents a dummy pulse. Referring also to FIG. 6b, in the present embodiment, the RBS2, the RBS4, the RBS8, and the RBS9 are not input until a predetermined time T0 elapses from the time that the RBS RBS1, the RBS3, the RBS7, and the RBS8 were input. Therefore, the timer 46 outputs a logic high pulse. Since the distance between RBS1 and RBS2 on the magnetic disk is long, the influence of adjacent magnetic forces is small. Therefore, if the three RBSs, RBS1, RBS2 and RBS3, are compared in comparator 36, no influence of the magnetic force between the RBS1 and RBS2, or the RBS3 in which that influence is small will be taken into consideration. Hence, a pulse corresponding to the amount of shift of the RBS2 will be selected. For this reason, a logic high pulse is output to ignore the RBS3 so that the RBS2 is not compared as a value decreased more than the amount that the magnitude of the peak of the RBS2 was decreased.

Also, the MUX 40 outputs a pulse in which the peak position of the RBS(k−1) is corrected in the direction opposite to the direction of shift represented by the pulse from the FIFO 38. Based on the pulse representing the direction of shift of the peak position of the RBS(k−1) output from the FIFO 38 and based on the combination of the output lines 48n1 to 48n4, the MUX 40 selects and outputs a pulse from the delay lines E10, . . . N, L10. Therefore, to synchronize the timing at which the MUX 40 inputs the pulse representative of the direction and amount of peak position shift of the RBS(k−1), the delay circuit 44 delays an input pulse a predetermined time T0. Similarly, the delay circuit 100 delays an input pulse a predetermined time. For example, if the RBS3 is not input even after a predetermined time T0 has elapsed since the RBS2, the timing at which the MUX 40 inputs from the FIFO 38 the pulse representative of the direction of peak position shift of the RBS2 is not synchronized with the pulses that are input through the delay lines E10, E9, . . . N, E1, E2, . . . , and E10. Therefore, the timer 46 outputs a dummy pulse after a predetermined time elapses from the time that the pulse of the amplitude sensing circuit 26 corresponding to the RBS was input, and the next pulse.

The pulse output from the timer 46 is output to OR gates 28 and 42 and is not output to the delay circuit 44. Hence, the delay circuit 44 never outputs a dummy pulse D to the delay lines E10 through E1, N, and L1 through L10. Therefore, a signal in which a peak position was corrected based on the dummy pulse is not output by the MUX 40.

As described above, according to this embodiment, the direction of shift of the peak position of the RBS positioned in the center of three consecutive RBSs (including a dummy pulse) is detected based on the magnitudes of the peaks of the three consecutive RBSs, and the pulse of the PDS corresponding to the position of the centrally positioned peak is corrected based on the detected direction of shift and on the amount of shift of the peak position corresponding to a ratio of the magnitude of the peak of the RBS to a normal value. Therefore, the amplitude of the read signal is neither enlarged nor contracted. Hence, a deterioration in the S/N ratio is reduced and the peak position of the read signal is corrected to an accurate position. Therefore, the storage density of written data on a magnetic disk is not as limited by the influence of the magnetic forces from the data written on the magnetic disk; and the density of written data on a magnetic disk can be increased.

In the preferred embodiment, the correction circuit comprises an analog circuit. Therefore, the magnetic disk unit is reduced in size and cost.

Although the amplitude sensing circuit comprises four output lines in the preferred embodiment, the present invention is not limited to four output lines. In an alternative embodiment, the present invention comprises a plurality of output lines corresponding to the number of normal values divided by a threshold level.

The present invention is not limited to a set number of or set interval between threshold levels. In an alternative embodiment, the amplitude sensing circuit comprises a plurality of threshold levels, not equal to 10. Alternatively, the interval between threshold levels varies. For example, the interval between TLs is narrowed near the normal value and is increased as a value becomes smaller than the normal value.

In the preferred embodiment the amount of shift (nS) from the reference position of the peak position of the RBS increases as the difference (step number) between TL corresponding to the magnitude of a front peak and TL corresponding to the magnitude of a back peak increases. In an alternative embodiment of the present invention, the relationship between the amount of shift (nS) and the step number is expressed by a second order equation. In another alternative embodiment, the relationship between the amount of shift and the step number is expressed by a combination of a first order equation and a second order equation.

An alternative embodiment of the present invention will be described with reference to the drawings. In the alternative embodiment, a microcomputer corrects the peak position of the RBS by digital-processing. The same reference numerals will be applied to the same constitutions as the first embodiment and a description of the same constitutions will be omitted.

Figures 7, 8, 9:
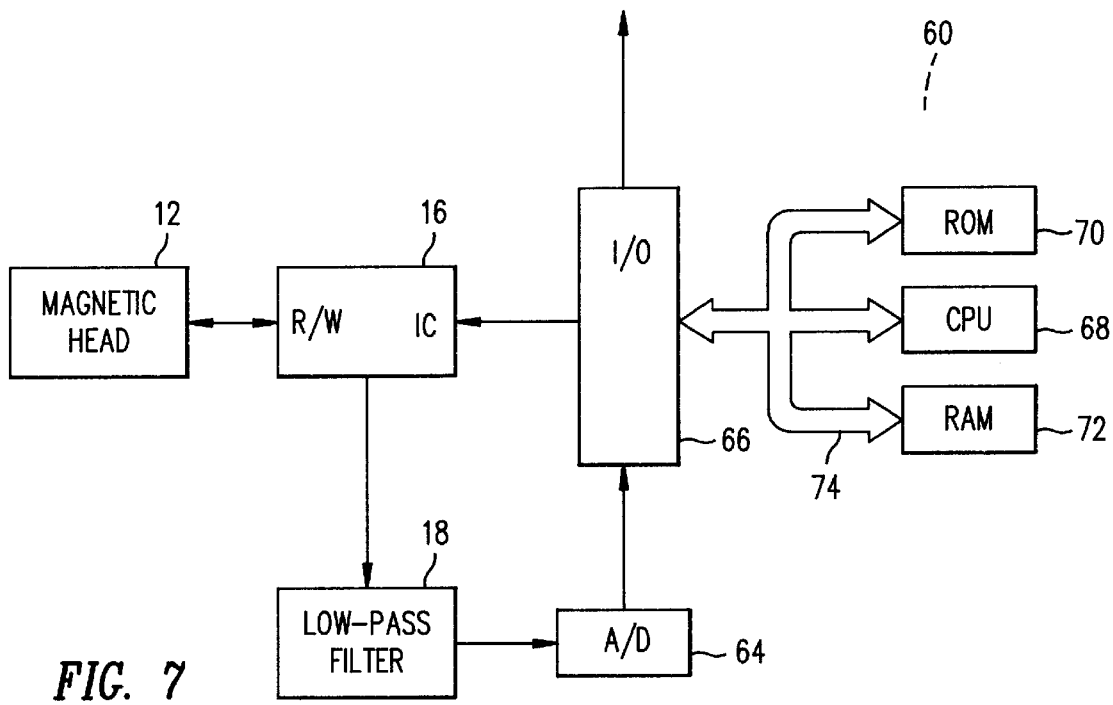

Referring now to FIG. 7, a magnetic disk unit of the alternative embodiment is shown. The magnetic disk unit comprises a magnetic head 12, a R/W IC 16, a low-pass filter 18, and a microcomputer 60. The microcomputer 60 comprises a CPU 68, a ROM 70, a RAM 72, and an I/O port 66, which are interconnected by a bus 74.

The I/O port 66 connects to the low-pass filter 18 through the R/W IC 16 and the analog to digital A/D converter 64.

Referring to FIG. 8, the RAM 72 provides storage for a timing table 72A for storing a predetermined time. The timing table 72A comprises areas 72A1, 72A2, 72A3 for storing the time that the RBS is input.

Referring to FIG. 9, the RAM 72 also provides storage for an amplitude table 72B for storing an amplitude. Also, the amplitude table 72B comprises areas 72B1, 72B2, 72B3 for storing the magnitude of the peak of the RBS.

Figure 11:
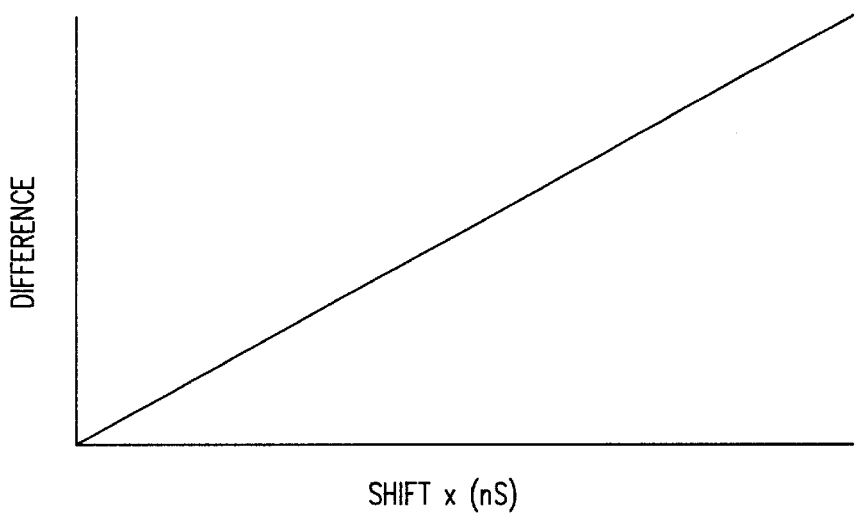

Referring to FIG. 11, a graph of the relationship between the amount of shift and the difference between TL of the front and back peaks is shown. The RAM 72 stores the relationship information as a map.

Figure 10A:
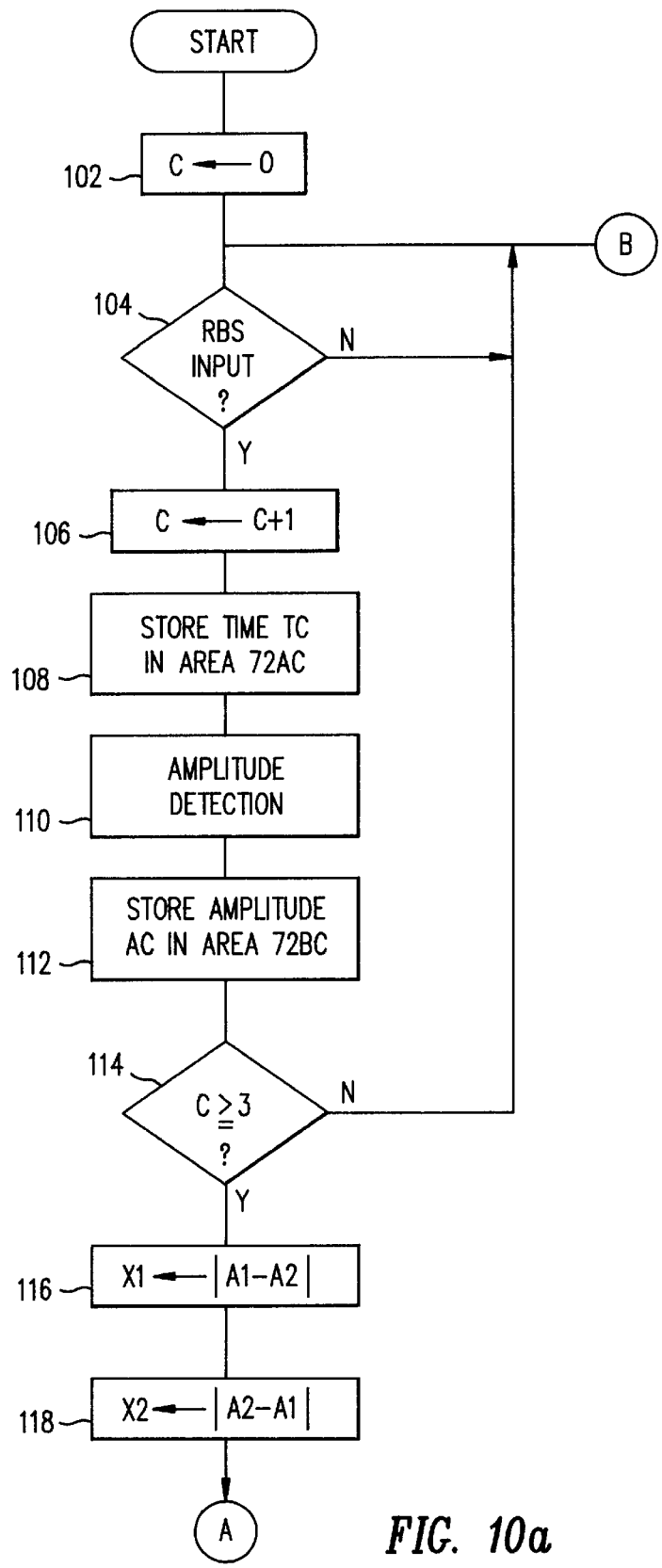
FIGS. 10a and 10b are flowcharts of the main routine of the alternative embodiment.
Figure 10B:
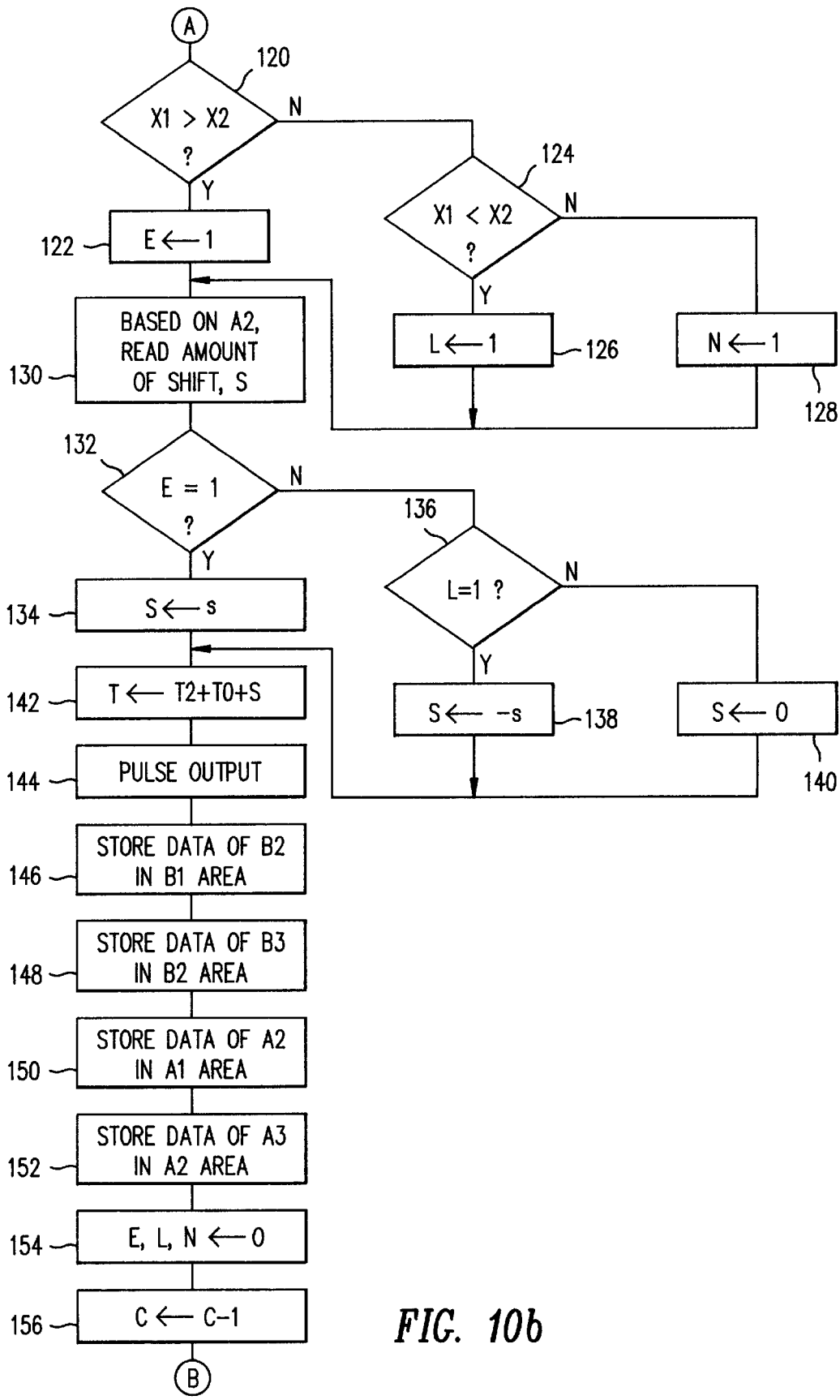
Figure 12A:
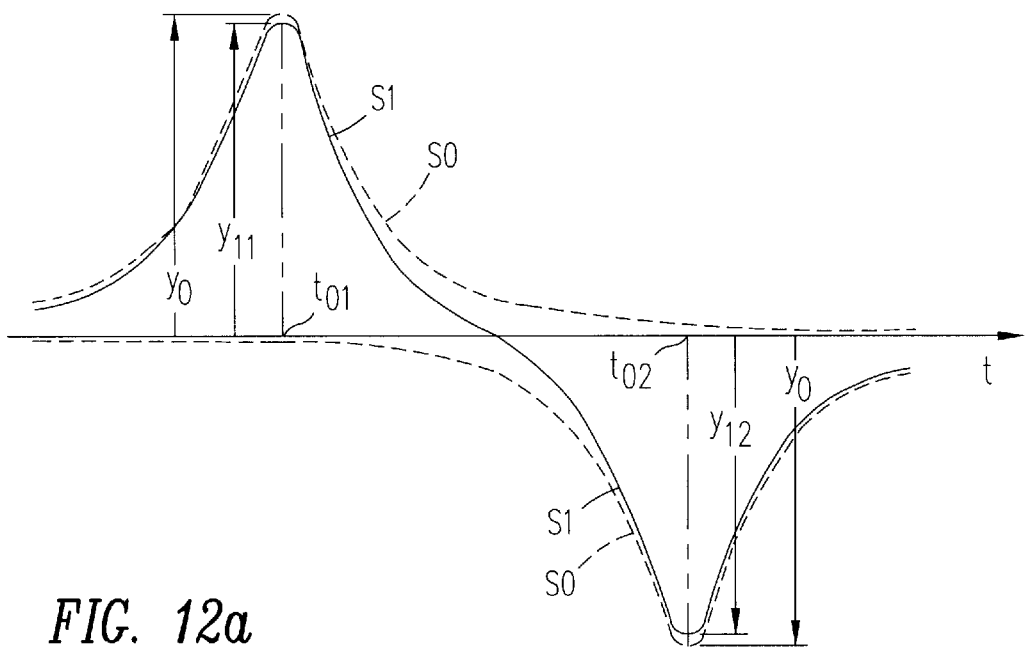
FIG. 12a is a graph showing the relationship between an RBS at a low storage density and an RBS unaffected by other signals.
Figure 12B:
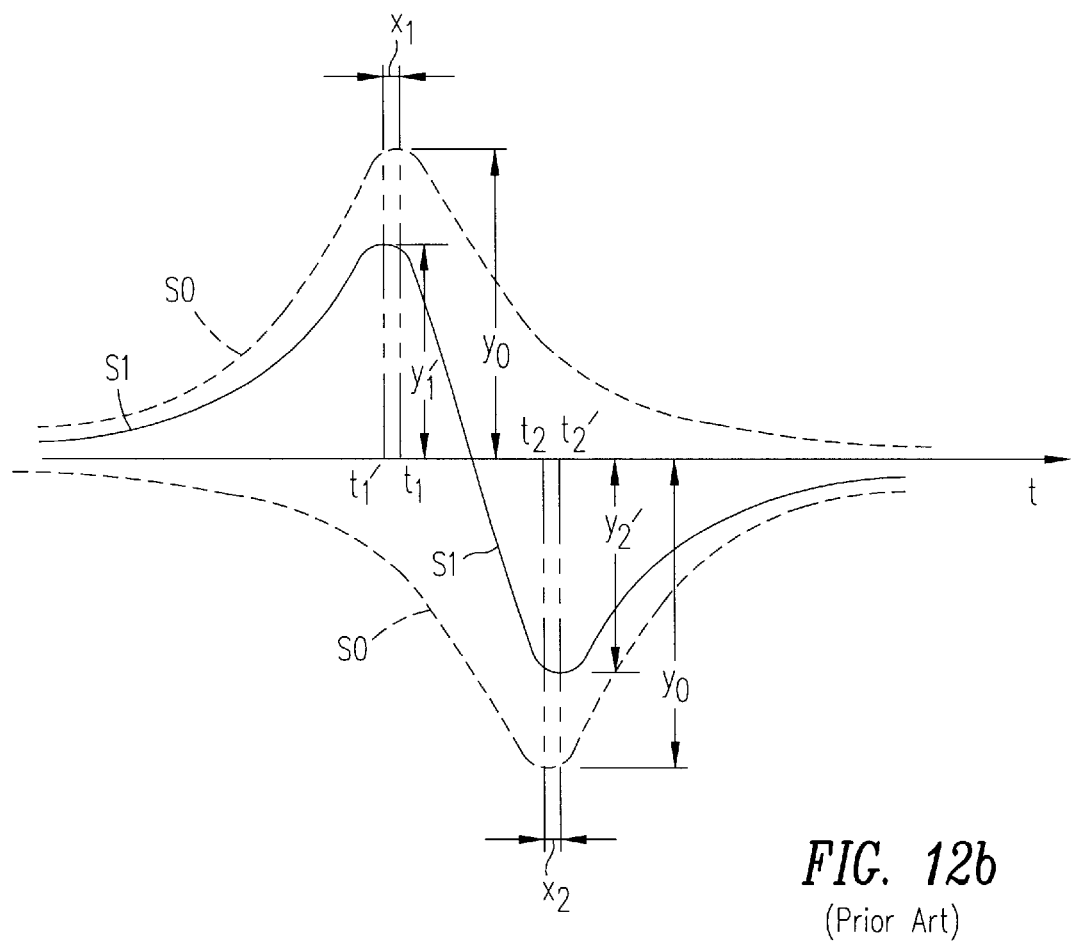
FIG. 12b is a graph showing the relationship between an RBS at a high storage density and an RBS unaffected by other signals.

The ROM 70 stores the control program corresponding to the flowcharts shown in FIGS. 10a and 10b.

Referring to FIGS. 10a and 10b, flowcharts describing the operation of the preferred embodiment of the present invention are shown. First, in step 102, when the R/W IC 16 receives a control signal for reading data, a variable C, identifying an input RBS, is initialized to 0. In step 104, the CPU determines whether an RBS is input.

If the control signal is converted to an analog value by the D/A converter 62 and input to the R/W IC 16, based on the input signal, the R/W IC 16 controls the magnetic head 12, so that data is read from the magnetic disk. The read signal comprising the read data is input to the low-pass filter 18 by the R/W IC 16. The low-pass filter 18 cuts the high-frequency wave of the read signal and passes the low-region/frequency component of the RBS. After passing through the low-pass filter 18, the A/D converter converts the RBS to digital form. The RBS is then input to the microcomputer 60. After the RBS is input to the microcomputer 60, in step 104 the RBS is determined as input. Then, in step 106, the variable C is incremented by 1.

In step 108, the time that the RBS was input is stored in the area 72AC. Since C is equal to 1 at the present stage, area 72AC is equivalent to area 72A1. A software timer detects the time that the RBS was input (not shown).

In step 110, the amplitude of the input RBS is detected. In step 112, the value of the detected amplitude is stored in the area 72BC. Since C is equal to 1 at the present stage, area 72BC is equal to area 72B1. In step 114, the CPU determines whether the variable C is greater than or equal to 3. If C is greater than or equal to 3, then step 114 returns to step 104, and steps 104 through 114 are repeated. If the foregoing steps are repeated and C is greater than or equal to three in step 114, then the operation of the following equation (3) is performed in step 116:

$$X1 = |A1-A2|P \qquad (3)$$

In step 118, the operation of the following equation (4) is performed:

$$X2 = |A2-A3|P \qquad (4)$$

Referring now to FIG. 10b, in step 120, if X1 is greater than X2, then step 120 advances to step 122. In step 122, because the second peak position of the RBS was shifted in a forward direction of time or is early, a flag E is set to 1, and step 122 advances to step 130. If X1 is not greater than X2, then step 120 advances to step 124, in which the CPU determines if X1 is smaller than X2. If X1 is less than X2, step 124 advances to step 126. In step 126, because the second peak position of the RBS was shifted in a backward direction of time or late in time, a flag L is set to 1, and step 126 advances to 130. If X1 is not less than X2, because the second peak position of the RBS is equal to its original peak position, step 124 advances to step 128, in which a flag N is set to 1, and step 128 advances to step 130.

In step 130, the amount of shift, s, is read from RAM based on the difference between the values of the amplitudes stored in the areas 72B1 and 72B3. In particular, the difference between the amplitude values stored in the areas 72B1 and 72B3 is calculated. Based on the difference, the corresponding amount of shift s is read from the map shown in FIG. 11.

In step 132, if the flag E has been set to 1, step 132 advances to step 134. In step 134, because the second peak position of the RBS was shifted in a forward direction of time by an amount of shift s, the amount of shift s is set to an amount of shift S which includes information on the direction of time, and step 134 advances to step 142. If E is not equal to 1, then step 132 advances to step 136. In step 135, the CPU determines whether the flag L was set to 1. If L is set to 1, then step 136 advances to step 138. In step 138, because the second peak position of the RBS has been shifted in a backward direction of time (late) by the read amount of shift s, the amount of shift S includes information on the direction of time and is set to the product of the read amount of shift s and −1, and step 138 advances to step 142. If L is not set to 1, then step 136 advances to step 140. In step 140, because the second peak position of the RBS is equal to its original peak position, the amount of shift S is set to 0, and step 140 advances to step 142.

In step 142, a value T is set to the sum of the amount of shift S plus a predetermined time T0 plus the time T2. Time T2 is the value of time stored in the area 72A2. In step 144 a pulse is output in which the peak position of the RBS is corrected to time T.

In step 146, the amplitude value A2, which is stored in area 72B2, is stored in area 72B1. In step 148, the amplitude value A3, which is stored in the area 72B3, is stored in area 72B2. In step 150, the time T2, which is stored in the area 72A2, is stored in the area 72A1. In step 152, the time T3, which is stored in the area 72A3, is stored in the area 72A2.

In step 154 the flags E, L, and N are set to 0. In step 156, the variable C is decremented by 1. After completing step 156, the processor returns to step 104 and the process repeats.

Thus, in the preferred embodiment of the present invention, the direction of the position shift a peak of interest is detected based on the magnitudes of three consecutive RBSs: a peak of interest, a front peak, and a back peak. The peak of interest's position is corrected based on the detected direction of shift and on the amount of shift obtained based on the difference between the front peak and the back peak. Therefore, the amplitude of the read signal is neither enlarged nor contracted. Hence, a deterioration in the S/N ratio is reduced and the peak position of the read signal is corrected to an accurate position.

Consequently data storage density of written data on a magnetic disk is not as limited by the influence of magnetic force of the data, and the storage density of written data on a magnetic disk is increased.

In another alternative embodiment, the relationship between the amount of peak position shift of the RBS and the ratio between the magnitudes of the front and back peaks are stored as a map.

In another alternative embodiment, the relationship between the amount of peak position shift of the RBS and the difference or ratio between the magnitudes of the front and back peaks, is an arbitrary function, such as a first order equation, a second order equation, or a combination of first and second order equations. Therefore, the equation is stored in advance, and the amount of shift is obtained from the stored equation.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

We claim:

1. A read signal correction apparatus for a disk drive recording channel, comprising:

a peak detector for detecting a magnitude and position of a plurality of peaks in a read signal, said plurality of peaks comprising a peak of interest, a front peak immediately preceding said peak of interest, and a back peak immediately following said peak of interest;

a level sensor for sensing the corresponding threshold level of said detected magnitude of said peak of interest, said front peak, and said back peak;

a shift detector for obtaining a direction and an amount of shift for said peak of interest with respect to a reference position, said direction and amount of shift being calculated using said threshold levels of said peak of interest, said front peak and said back peak; and a shift corrector for correcting said position of said peak of interest based on said obtained direction and amount of shift.

2. A read signal correction apparatus for a disk drive recording channel as recited in claim 1, wherein said amount of shift is calculated using a difference between said threshold level of said front peak and said threshold level of said back peak.

3. A read signal correction apparatus for a disk drive recording channel as recited in claim 1, wherein said amount of shift is calculated using a ratio between said threshold level of said front peak and said threshold level of said back peak.

4. A method for correcting a read signal in a disk drive recording channel comprising the steps of:

detecting a magnitude and position of a plurality of peaks in a read signal, said plurality of peaks comprising a peak of interest, a front peak immediately preceding said peak of interest, and a back peak immediately following said peak of interest;

sensing the corresponding threshold level of said detected magnitude of said peak of interest, said front peak, and said back peak;

obtaining a direction and an amount of shift for said peak of interest with respect to a reference position, said direction and amount of shift being calculated using said threshold levels of said peak of interest, said front peak and said back peak; and correcting said position of said peak of interest based on said obtained direction and amount of shift.

5. A method as recited in claim 4, wherein said amount of shift is calculated using a difference between said threshold level of said front peak and said threshold level of said back peak.

6. A method as recited in claim 4, wherein said amount of shift is calculated using a ratio between said threshold level of said front peak and said threshold level of said back peak.

7. In a disk drive system comprising a peak detector for detecting a magnitude and position of a plurality of peaks in a read signal, said plurality of peaks comprising a peak of interest, a front peak immediately preceding said peak of interest, and a back peak immediately following said peak of interest, a level sensor for sensing the corresponding threshold old level of a detected magnitude of said peak of interest, said front peak and said back peak, and a processor in communication with said peak detector and said level sensor, a method of correcting said read signal comprising the processor executed steps of:

obtaining said threshold level of said peak of interest, said front peak, and said back peak;

obtaining a direction and amount of shift for said peak of interest, said direction and amount of shift being calculated using said threshold levels of said peak of interest, said front peak, and said back peak; and correcting the position of said peak of interest using said obtained direction and amount of shift.

8. A method as recited in claim 7, wherein said amount of shift is calculated using a difference between said threshold level of said front peak and said threshold level of said back peak.

9. A method as recited in claim 7, wherein said amount of shift is calculated using a ratio between said threshold level of said front peak and said threshold level of said back peak.

10. A disk drive system, comprising:

a data recording disk having radially spaced tracks;

an actuator arm comprising a magnetic head in communication with said tracks;

read/write electronics in communication with said actuator arm comprising a detector for detecting a magnitude and position of a plurality of peaks in a signal, said plurality of peaks comprising a peak of interest, a front peak immediately preceding said peak of interest, and a back peak immediately following said peak of interest;

a processor in communication with said read/write electronics;

read signal correction electronics in communication with said read/write electronics, said read signal correction electronics comprising:

an amplitude sensor for sensing the corresponding threshold level of said detected magnitude of said peak of interest, said front peak and said back peak;

a shift detector for obtaining a direction and amount of shift for said peak of interest with respect to a reference position, said direction and amount of shift being calculated using said threshold levels of said peak of interest, said front peak and said back peak; and a shift corrector for correcting the position of said peak of interest based on said obtained direction and amount of shift.

11. In a disk drive system, comprising a data recording disk having radially spaced tracks, an actuator arm comprising a magnetic head in communication with said tracks, read/write electronics comprising read electronics, said read electronics for detecting a magnitude and position of a plurality of peaks in a read signal, said plurality of peaks comprising a peak of interest, a front peak immediately preceding said peak of interest, and a back peak immediately following said peak of interest, and a processor in communication with said read/write electronics, a method of correcting said read signal comprising the steps of:

sensing the threshold level of said detected magnitude of said peak of interest, said front peak, and said back peak;

obtaining a direction and amount of shift for said peak of interest, said direction and amount of shift being calculated using said threshold levels of said peak of interest, said front peak, and said back peak; and correcting the position of said peak of interest using said obtained direction and amount of shift.

12. In a disk drive system comprising a data recording disk having radially spaced tracks, an actuator arm comprising a magnetic head in communication with said tracks, read/write electronics comprising read electronics, said read electronics for detecting a magnitude and position of a plurality of peaks in a read signal, said plurality of peaks comprising a peak of interest, a front peak immediately preceding said peak of interest, and a back peak immediately following said peak of interest, a level sensor for sensing the corresponding threshold level of a detected magnitude of said peak of interest, said front peak and said back peak, and a processor in communication with said read/write electronics and said level sensor, a method of correcting said read signal comprising the processor executed steps of:

obtaining said threshold level of said peak of interest, said front peak, and said back peak;

obtaining a direction and amount of shift for said peak of interest, said direction and amount of shift being calculated using said threshold levels of said peak of interest, said front peak, and said back peak; and correcting the position of said peak of interest using said obtained direction and amount of shift.

* * * * *